US008702484B2

United States Patent
Neidigh et al.

(10) Patent No.: US 8,702,484 B2
(45) Date of Patent: Apr. 22, 2014

(54) AUTOMATIC CORN CUTTER APPARATUS

(75) Inventors: Ronnie Charles Neidigh, Pueblo, CO (US); Dwight Allen Blickensderfer, Pueblo, CO (US); Denis Ralph Beland, Owatonna, MN (US)

(73) Assignee: Magnuson Corporation, Pueblo, CO (US)

( * ) Notice: Subject to any disclaimer, the term of this patent is extended or adjusted under 35 U.S.C. 154(b) by 397 days.

(21) Appl. No.: 13/317,763

(22) Filed: Oct. 27, 2011

(65) Prior Publication Data
US 2012/0085247 A1     Apr. 12, 2012

Related U.S. Application Data

(63) Continuation-in-part of application No. 12/148,169, filed on Apr. 17, 2008, now abandoned.

(51) Int. Cl.
*A01F 11/00* (2006.01)
*A01F 11/06* (2006.01)

(52) U.S. Cl.
USPC ............................................................ 460/17

(58) Field of Classification Search
CPC ......... A01D 82/00; A01F 11/00; A01F 11/06; B07C 5/02; G01B 11/2433
USPC ...... 56/16.4 A, 16.4 R; 83/36, 100, 165, 167; 99/567; 198/395, 399; 460/1, 56, 53, 460/48, 52, 57, 25, 114, 17; 700/213
See application file for complete search history.

(56) References Cited

U.S. PATENT DOCUMENTS

| | | | | |
|---|---|---|---|---|
| 2,951,484 | A | * | 9/1960 | Cover et al. ..................... 460/17 |
| 3,401,727 | A | * | 9/1968 | Blanshine et al. .......... 241/101.5 |
| 3,455,307 | A | * | 7/1969 | Ross et al. ....................... 460/17 |
| 4,391,172 | A | * | 7/1983 | Galland et al. ................. 83/403 |
| 4,625,735 | A | * | 12/1986 | Anderson et al. ............... 460/32 |
| 6,932,286 | B2 | * | 8/2005 | Smith et al. ................... 239/650 |

* cited by examiner

*Primary Examiner* — Robert Pezzuto
(74) *Attorney, Agent, or Firm* — Bruce H Johnsonbaugh (57) ABSTRACT

An automatic corn cutting apparatus for cutting kernels off of husked ears of corn. The ears may be presented to the cutting knives either tip end or butt end first. The ears are fed into the cutting knives by a pair of drive rollers carried by a pair of articulating drive shafts. The drive shafts move in a plane perpendicular to the axis along which the ears are fed to the cutting knives. A sensor, preferably a linear variable differential transformer, or LVDT, is carried by one of the drive shafts remotely from the ears, i.e. the LVDT does not contact the ears. The sensor detects the profile of each ear of corn, and the profile is used by a knife controller to efficiently remove the kernels from each ear of corn.

10 Claims, 9 Drawing Sheets

(Prior Art)

FIG. 8

AUTOMATIC CORN CUTTER APPARATUS

CROSS-REFERENCE TO RELATED APPLICATION

This application is a Continuation-In-part of U.S. application Ser. No. 12/148,169 filed on Apr. 17, 2008 now abandoned.

BACKGROUND

The present invention pertains generally to systems for automatically removing corn kernels from the cob. More particularly, the present invention provides an automatic corn cutter which cuts the kernels off the cobs in a more efficient manner (i.e. less damage to kernels) than the prior art, significantly increasing the yield of usable whole kernels.

The prior art knives used to automatically cut kernels off the cob are typically programmed to "ride an imaginary cob." In other words, the knives are programmed to cut in a predetermined pattern that often does not conform to the shape of the cob, resulting often in damaged and unusable kernels.

The prior art also typically requires the ears of corn to be aligned "tip end" first before entering the kernel cutting knives. The alignment apparatus of the prior art causes some damage in handling the ears, and reduced yield whenever the ears are incorrectly presented "butt end" first to the cutting knives. Such incorrect alignment causes the loss of approximately 5% of otherwise usable kernels.

The prior art also includes a mechanical sensor wherein a finger physically rides on the surface of the ear, as shown in the Ross U.S. Pat. No. 3,455,307. The weakness of Ross is that the sensing finger is subject to being thrown off course by husk fragments or other debris on the ear of corn.

There is clearly a need to increase the efficiency of automatic corn cutting machines. The usable corn kernels lost by prior art corn cutters represents a terrible economic and resource waste in a world of rising food costs and massive food shortages.

The present invention overcomes the above-described problems with the prior art.

BRIEF SUMMARY OF INVENTION

The present invention provides, for the first time known to applicants, a system whereby the kernel cutting knives are able to follow the actual surface of each individual ear of corn presented to the knives without relying on a mechanical finger to ride the surface of the ear of corn.

The present invention accepts ears either "tip" end or "butt" end first and performs efficiently regardless of ear alignment.

The present invention utilizes a sensor positioned remotely from the ear of corn entering the cutting knives, i.e. the sensor does not contact the ear of corn. The sensor is not subject to being thrown off course by husk fragments or other debris on the ear, as is the case with the Ross prior art mentioned above. The sensor is preferably a linear variable differential transformer of LVDT. The LVDT is mounted remotely from the ear, and senses the movement of at least one of the drive shafts carrying the drive or feed rollers relative to the axis of rotation of the ears of corn.

The knives are programmed to follow the sensing system signal to track the contour of each ear of husked corn and to cut at a predetermined depth beneath the outer surface of the kernels on said ear of corn. The predetermined depth includes the thickness of the kernels. The thickness of the kernels typically varies over the length of the ear of corn. The kernel thickness also varies in response to variables such as variety of corn, the geographic location where the corn was raised, amount of rainfall and other variables. However, for a given amount of corn to be processed, the equipment operator may simply measure the kernel thickness of a sample ear of corn; that thickness becomes an assigned, fixed depth of cut for the kernel cutting knives.

In another embodiment, the kernel cutting knives may be programmed to cut at various depths below the surface over the length of a single ear. For example, a linear relationship that would cut ⅛ inch deep if the ear is 1 inch in diameter and proportionally deeper until it cuts ¼ inch deep if the ear is 2 inches in diameter (see FIG. 3B and description below). Other mathematical models are possible such as curves, sinusoidal, etc.

Since the knives of the present invention follow the contour of each ear of corn, it is not necessary to align the ears. The present invention allows the ears to be presented to the kernel cutting knives either "tip end" first or "butt end" first. The present invention therefore eliminates the need for alignment equipment required in prior art systems. Such alignment equipment involves sensors and apparatus to realign ears to a proper orientation.

The present invention significantly increases the yield of automatic corn cutters for the reasons stated above.

A primary object of the present invention is to provide an automatic corn cutter which more efficiently cuts kernels off ears of corn with reduced damage to the kernels, compared with the prior art.

A further object of the invention is an automatic corn cutter which automatically and remotely senses the size, shape and orientation of each ear of corn and automatically moves the cutting knives to follow the contour of each ear of corn presented to the knives.

A further object of the invention is an automatic corn cutter wherein ears can be presented either "tip end" or "butt end" first, thereby eliminating the need for alignment equipment.

Other objects and advantages will become apparent from the following description and drawings.

DETAILED DESCRIPTION OF THE DRAWINGS

Figure 1:
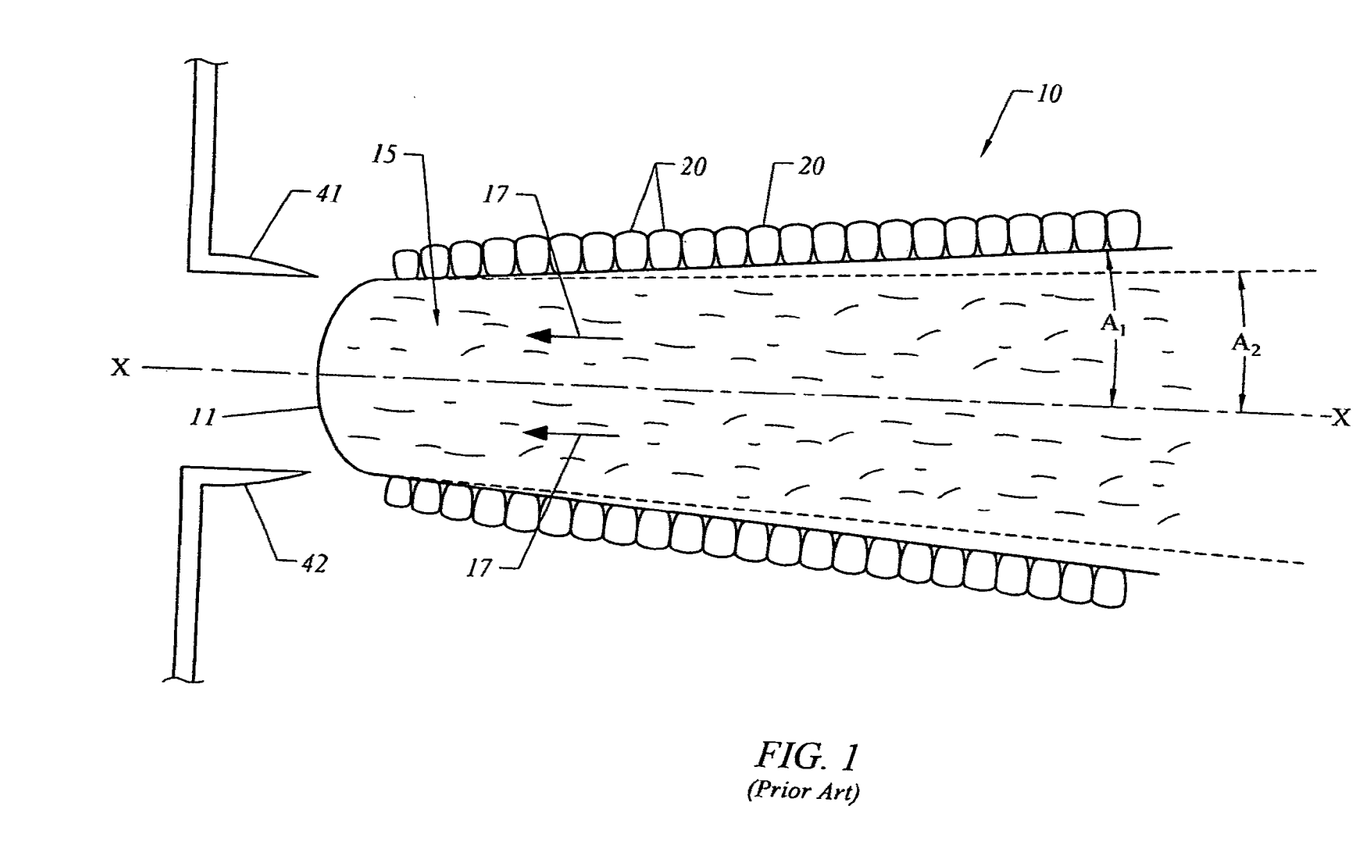
FIG. 1 is a schematic illustration of a typical prior art automatic corn cutter as an ear of corn is about to be fed into the kernel cutting knives.
Figure 2:
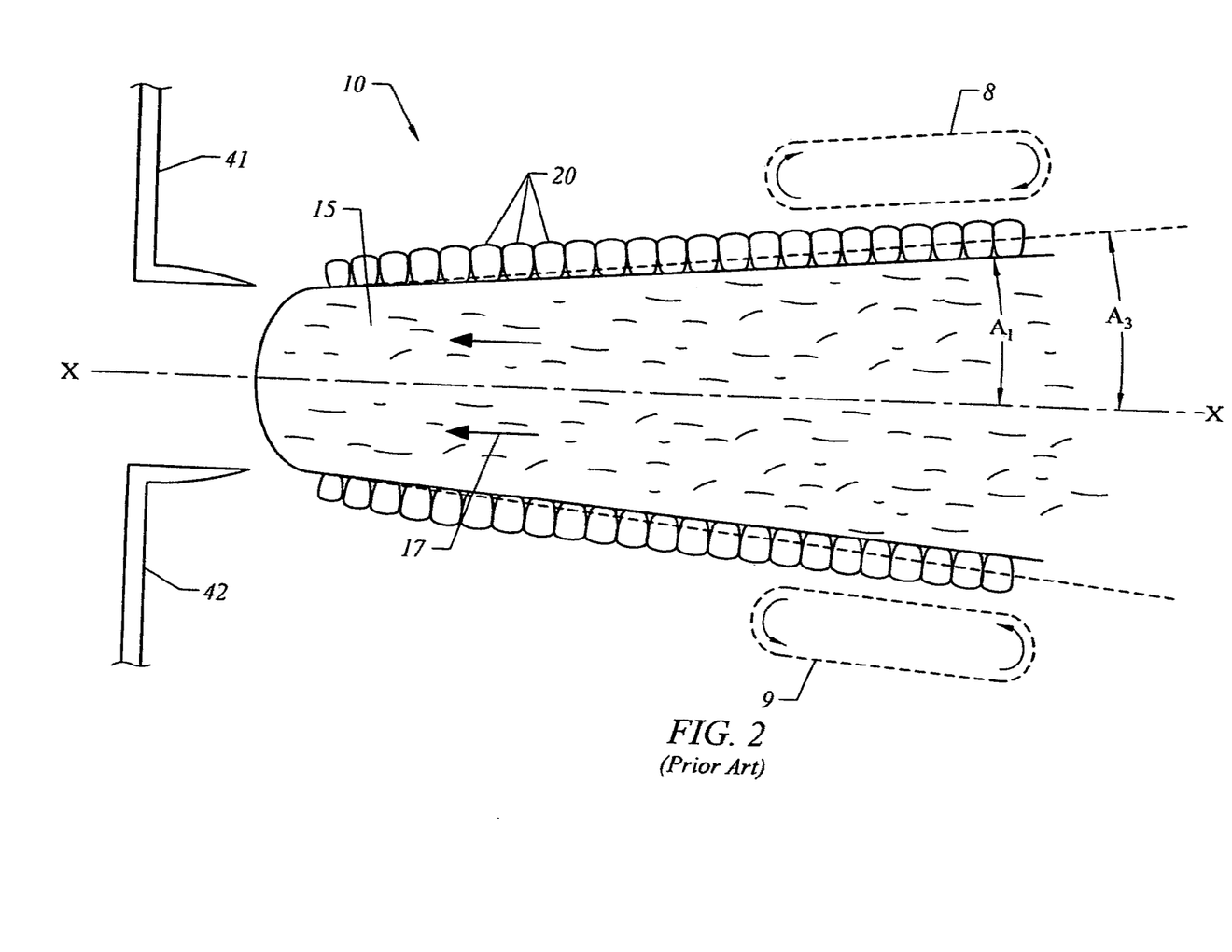
FIG. 2 is a schematic illustration of the same typical prior art automatic corn cutter shown in FIG. 1 wherein the kernel cutting knives are set to cut at a different angle than the knives illustrated in FIG. 1.

FIGS. 1 and 2 are schematic illustrations of a typical prior art automatic corn cutter having rotating kernel cutting knives 41 and 42. The prior art machines ordinarily have six rotating blades forming an "iris," much like the iris of a camera. The six knives are movable and mechanically linked in such a way as to permit the diameter of the iris to open and close while maintaining a uniform circle and to keep the knives evenly distributed around the circle. It is the job of the knives to cut the kernels from the cob at the correct depth below the outer surface of the kernels while cutting through or otherwise damaging a minimum of kernels. Only two blades 41 and 42 are illustrated for clarity. An ear of corn 10 is shown with its tip-end 11 presented to knives 41, 42 and moving in the direction of arrows 17 along axis X-X.

The present invention utilizes prior art techniques for conveying, metering and feeding ears into and through the cutting knives. Those techniques are well known in the art and are not described in detail herein in the interest of brevity, and not shown in the drawings for clarity. Conveyors and feed rollers known in the art convey singulated ears of corn into and through cutting knives 41, 42. Such conveyors and feeders typically include pairs of rollers on opposite sides of the ears of corn. One such pair of rollers 8 and 9 is shown in FIG. 2. The conveyor rollers are not shown in FIGS. 1, 3A, 3B and 4 for the sake of clarity. Although prior art singulators may be used together with the present invention, a novel singulator shown and described below is preferably used. The cob 15 of ear 10 carries kernels 20. The husk has previously been removed and the husk is therefore not shown in FIGS. 1 and 2. As noted above, the prior art blades 41, 42 are programmed to "ride an imaginary cob" and, as shown in FIG. 1, the cutting pathway of knives 41, 42 is set at an angle $A_2$. In FIG. 1, the actual cob 15 has a surface which is inclined at an angle $A_1$ with respect to the longitudinal axis X-X of ear 10 (and cob 15) and of the rotating knives 41, 42. Since the angle $A_1$ indicating the slope of the actual surface of cob 10 is greater than angle $A_2$, knives 41, 42 will cut into the cob and portions of the cob will be intermixed with the severed kernels.

In the case illustrated in FIG. 2, however, the prior art knives 41 and 42 are programmed to ride an imaginary cob having a surface angle of $A_3$ which, in fact, is larger than the actual surface angle $A_1$ of the cob 15. In this instance, as the ear 10 is driven into rotating blades 41, 42 in the direction of arrows 17 the knives will cut above the surface of the cob and damage most of the kernels 20 on the surface of cob 15.

Figure 3A:
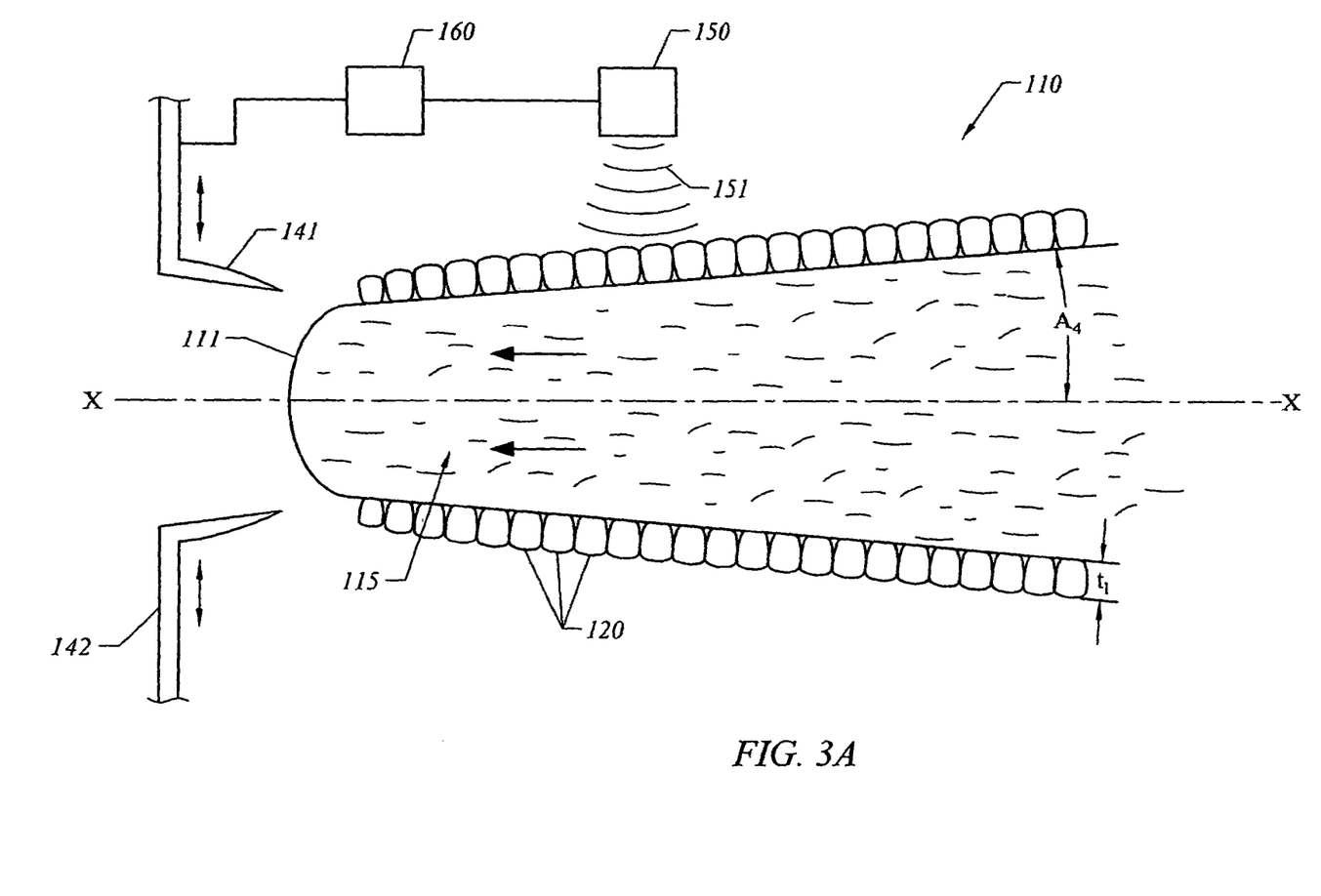
FIG. 3A is a schematic illustration of a first embodiment of the present invention showing an ear of corn being presented to kernel cutting knives.

FIG. 3A illustrates a first embodiment of the present invention wherein an ear of corn 110 having cob 115 and kernels 120 is presented to rotating kernel cutting knives 141 and 142 of the present invention. The ear 110 has previously had its husk removed by techniques known in the art.

A sensing means 150 is positioned upstream of kernel cutting blades 141, 142 and senses the actual surface contour of the ear 110 (i.e. the outer surface of kernels 120) being presented to knives 141, 142. As illustrated in FIG. 3A, the ear 110 has its tip end 111 presented to knives 141 and 142. Sensing means 150 is preferably a remotely positioned LVDT described below, or may be either a mechanical sensing device or an optical device, as illustrated in FIG. 3A, which generates a signal 151 directed at the surface of ear 110 and senses the actual contour of the outer surface of kernels 120. In the embodiment shown in FIG. 3, wherein the husk has been previously removed, the "surface" of the ear is the same as the outer "surface" of kernels 120. The information collected by sensing means 150 is transmitted to a controller 160 for knives 141-142. In the example of FIG. 3A, the angle $A_4$ sensed by sensing unit 150 is the same as the actual slope of the surface of cob 115. This allows the knives of the present invention to follow the actual surface of cob 115 much more closely than the knives of the prior art. As noted above, an assigned thickness $t_1$ of the row of kernels 120 is entered into the knife control mechanism 160. The thickness $t_1$ may be assigned arbitrarily or may be assigned by the operator actually measuring a sample ear from a batch about to be processed. Thickness $t_1$ may be fixed or variable over the length of the ear.

Figure 3B:
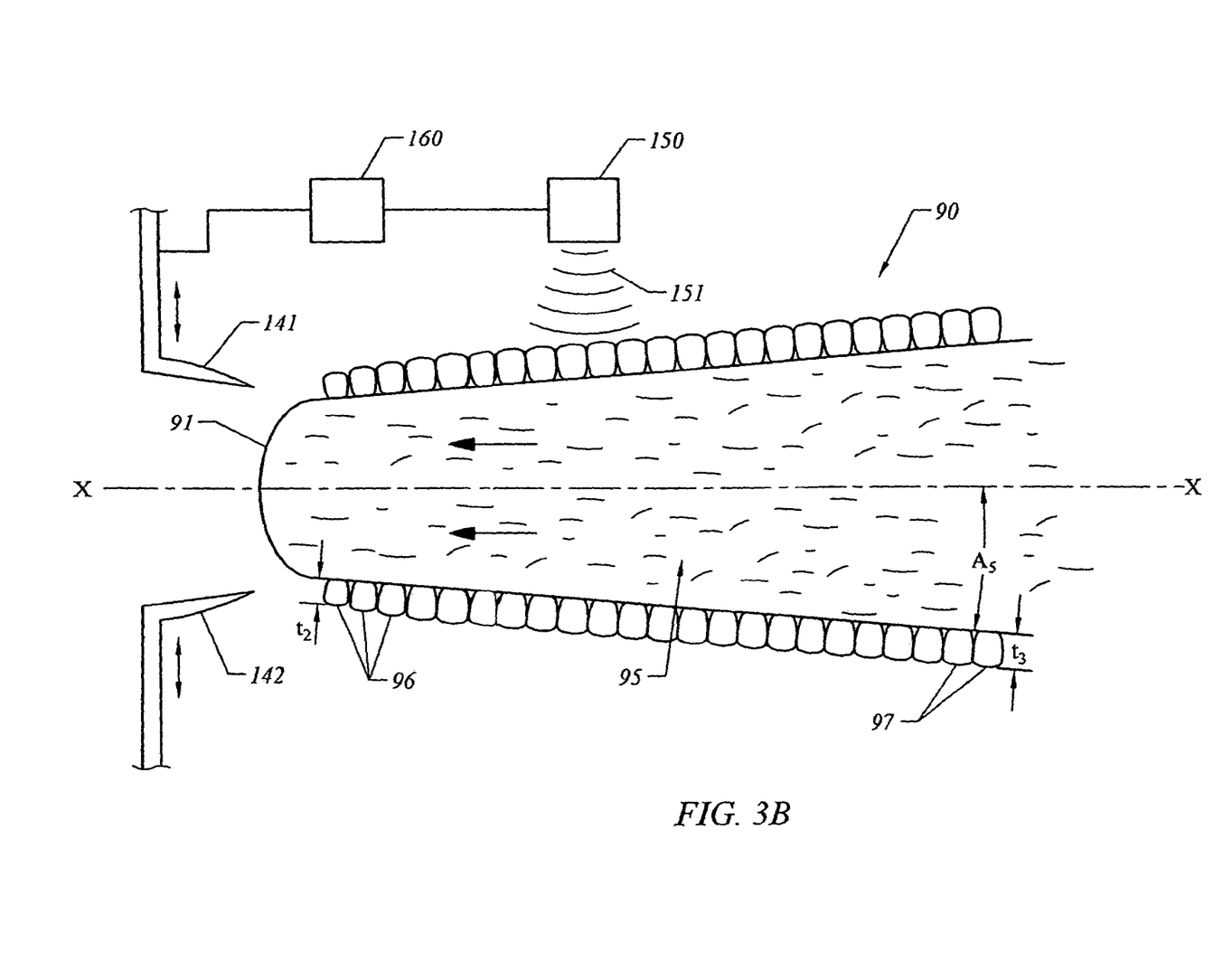
FIG. 3B is a schematic illustration of a variation of the embodiment shown in FIG. 3A wherein the size of the kernels on the ear of corn varies in proportion to the outer diameter of the exposed kernels of corn.

FIG. 3B illustrates a variation of the first embodiment of the invention shown in FIG. 3A. In FIG. 3B, the ear of corn 90 has its "tip end" 91 presented to kernel cutting knives 141, 142. However, the ear 90 has considerably smaller kernels 96 near its tip end 91 as compared to the kernels 97 which are on a thicker portion of cob 95. As shown in FIG. 3B, kernels 96 have a thickness $t_2$ which is approximately ⅛ inch and kernels 97 have a thickness $t_3$ which is approximately ¼ inch. The present invention allows the operator to manually set the angle $A_5$ at which the kernel cutting blades expand in order to account for the changing dimension of the kernels over the length of the cob 95. In the instance illustrated in FIG. 3B, the thickness of the kernels varies proportionately with the diameter of the cob 95. The present invention alternately allows the knife control means 160 to be programmed to automatically vary the depth of cut in proportion to the sensed outer diameter of the ear of corn.

Figure 4:
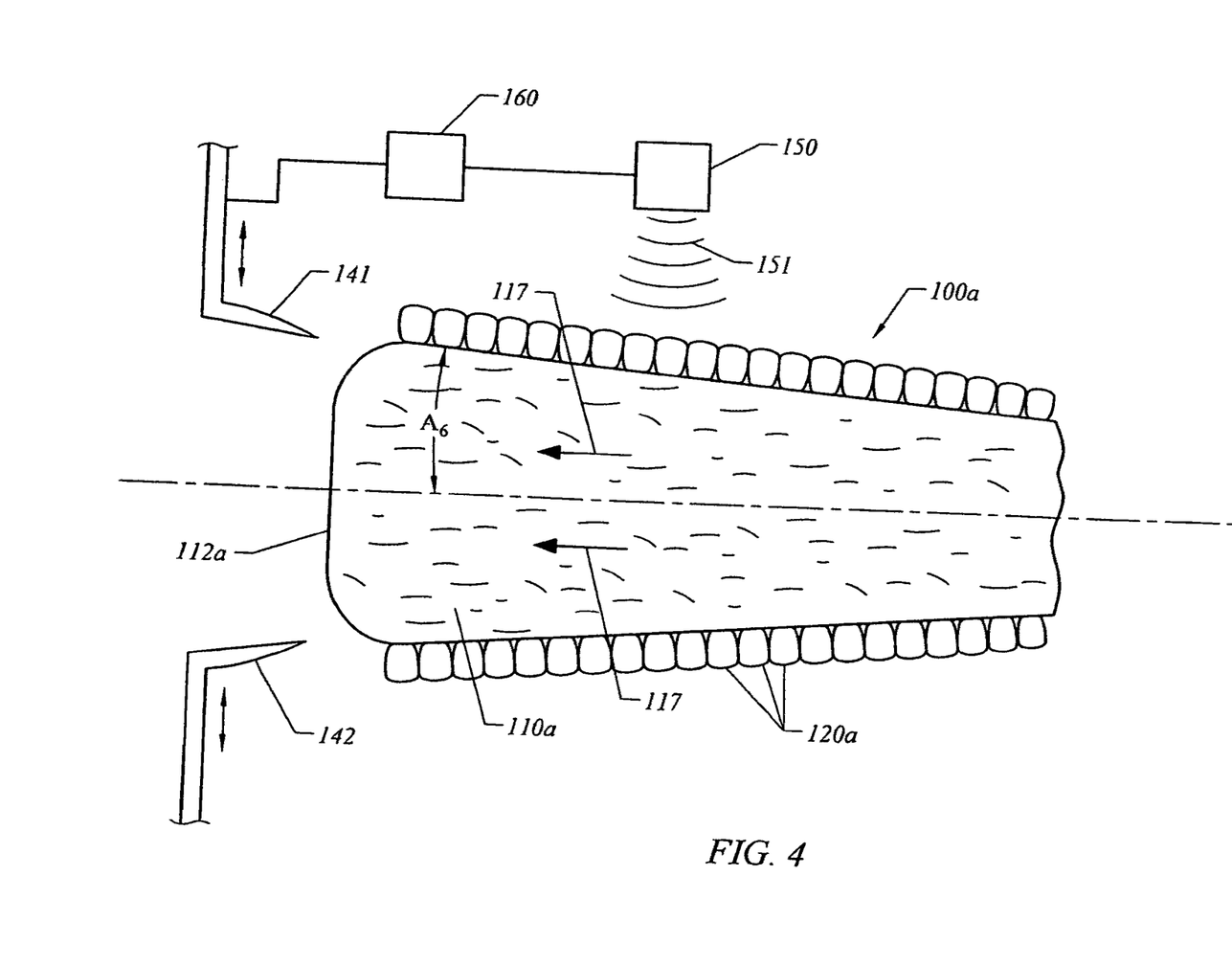
FIG. 4 is a schematic illustration of the embodiment of the invention shown in FIGS. 3A and 3B but wherein the ear of corn is presented to the kernel cutting knives "butt end" first.

FIG. 4 illustrates the embodiment of the invention shown in FIGS. 3A and 3B but wherein an ear 110a with kernels 120a is presented to the knives 141, 142 with it's "butt end" 112a entering the knives 141,142 first. In this situation, the surface of the cob 110a as sensed by sensing means 150 is inclined downwardly at an angle $A_6$. In this case, the knives 141, 142 will have to move closer together as the ear 110a passes through the knives in the direction of arrows 117.

As noted above, since the present invention is able to process ears presented either "tip end" first (FIG. 3A, 3B) or "butt end" first (FIG. 4), the alignment apparatus required by prior art machines is eliminated by the present invention. Prior art alignment apparatus is typically quite complex and its elimination is a significant advantage of the present invention. In addition, the present invention avoids the loss of usable kernels caused by prior art alignment apparatus.

Figure 5:
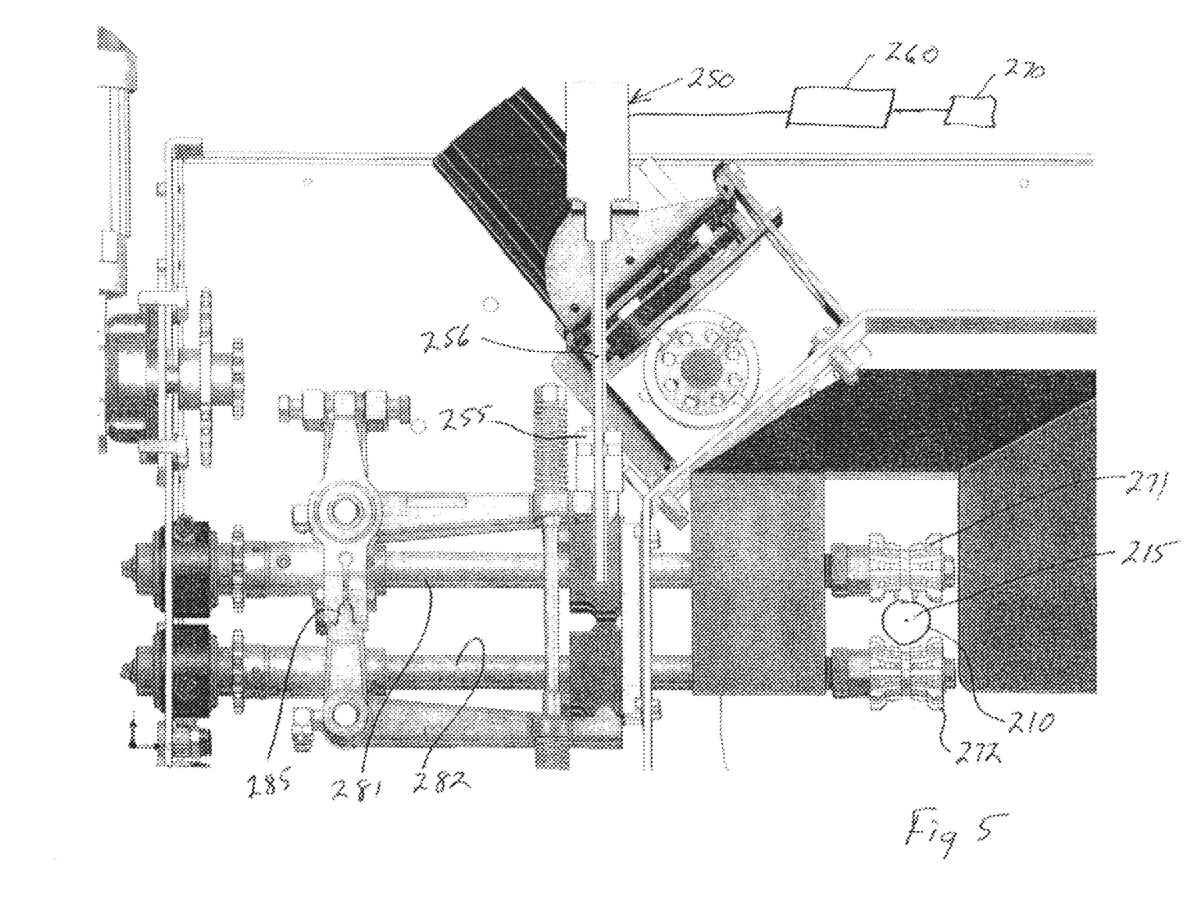
FIG. 5 illustrates the sensing mechanism and how it is mounted relative to an ear of corn.

FIG. 5 illustrates the preferred form of the invention. An ear 210 is being fed outwardly toward the viewer along an axis 215 by a pair of drive rollers 271 and 272. Drive rollers 271, 272 are carried by a pair of drive shafts 281, 282 respectively. Other feed mechanisms may be utilized without departing from the invention. Drive shafts 281, 282 both articulate equally about joint 285, allowing drive rollers 271 and 272 to follow the surface of ear 21 while keeping the center of ear 210 on axis 215. Ear 210 will be driven by drive rollers 271, 272 through movable cutting knives not shown in FIG. 5. Those knives will rotate around axis of rotation 215 to remove kernels from ear 210.

Sensing means 250 is preferably a linear variable differential transformer (LVDT). A mounting block 255 is linked to the top drive shaft 281. Mounting block 255 holds the cylindrical ferromagnetic core 256 of LVDT 250. As the ear 210 moves through the drive rollers 271, 272, the core 256 is moved up and down a distance proportional to the diameter of ear 210, producing a signal for the ear diameter profile which is sent to a controller or knife control means 260. In the preferred embodiment shown in FIG. 5, mounted block 255 is linked to only one drive shaft, i.e. drive shaft 281. The controller 260 is a Programmable Logic Controller, which determines an output to a servo motor 270 mechanically linked to the array of cutting knives (not shown in FIG. 5). Controller 260 and servo motor 270 together form a "Knife control means" for moving the array of cutting knives (not shown in FIG. 5) relative to axis of rotation 215 in response to input from sensing means 250 to efficiently cut the kernels off ear 210.

Prior to operation of the machine, a lookup table is generated within the PLC 260 to match a signal from the LVDT 250 to a corresponding desired cutter position via servo motor 270 operation. The calculation of the lookup table can also incorporate constant offsets that a user finds desirable to obtain optimal yield. As the ear passes through, the PLC continuously samples the voltage signal and determines where the signal is located on the lookup table. The corresponding position to that voltage is then sent to the servo motor 270.

A LVDT is a type of transformer used for measuring linear displacement. It consists of three coils around a cylindrical ferromagnetic core, which is attached to the item being measured and slides along the center of the coils. As the core moves, the voltage output of the coils changes. In this manner, a continuous signal is generated that linearly corresponds to the diameter of the ear over the length of the ear.

Figure 6:
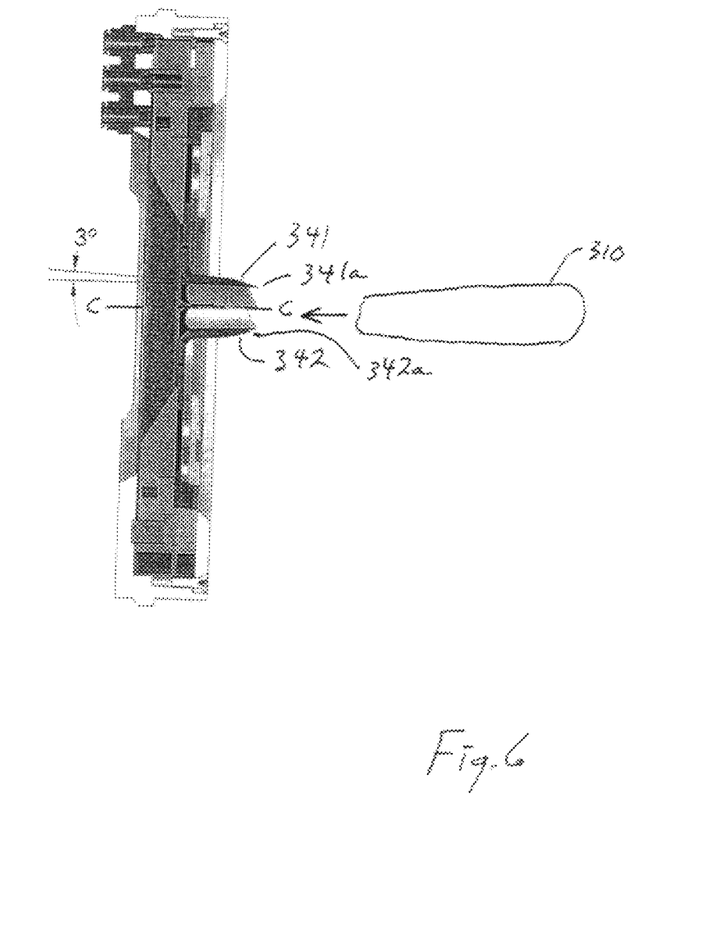
FIG. 6 is a sectional view of the cutter head (or array of kernel cutting knives) using a reverse blade angle.

FIG. 6 is a cross-sectional view of the array of cutting knives showing two knives 341 and 342. The ears of corn such as ear 310 approach blades 341, 342 from the right hand side. Their diameter has already been measured by the sensor 250 and the computer driven algorithm has opened the blades to the appropriate diameter. That diameter is determined by the actual outside diameter of the ear of corn and desired cutting depth entered by the machine operator or customer. The depth of cut is a variable value based on the diameter. For example if the ear is 2" in diameter, the knives are to cut ⅜" deep. If the ear is 1" in diameter, the knives are to cut ¼" deep. The cutting depth between and beyond those two cutting depths are mathematically calculated by the algorithm in the computer. It can be linear or any other geometric shape.

In previous corn cutter designs, the tips of the knife blades sloped away from the center line C-C along which the ear of corn is moving. This causes the knives to open as they pass through the ear of corn regardless of the actual Kernel size. The cutter head in the past also had an initial opening that was mechanically set. The ears of corn also had to be oriented to enter the knives small end first so the knife angle would not cut too small of a diameter at the large end.

The new design shown in FIG. 6 and in FIGS. 3A, 3B and 4 is able to cut ears that are oriented either way. To accomplish this, the design had two requirements. First, the knives had to have a reverse angle, wherein the tips of 341*a*, 342*a* are sloped toward the center line C-C, of about 2-4 degrees, and preferably 3 degrees as illustrated. Second, the knives had to be controlled by external means that did not rely on the angle of the of the knives for control. The algorithm and the controls allowed for flexibility in the cutting characteristics and the initial or home position of the knives could be any diameter. The knives could then open or close as required by the next ear of corn to be cut.

The overall design and the reverse angle of the knives permits much shorter ears of corn to be cut without jamming in the knives. In the past, very short ears could be pushed into the knives, but could not be pulled the rest of the way through the knives because of their short length. The new design permits ears that are nearly as short as their diameter to be pushed into the knives where they may remain until the next ear pushes them out. This is possible because the angle of the knives and their control does not apply any pressure onto the ear of corn as was the case in the old designs.

Figure 7:
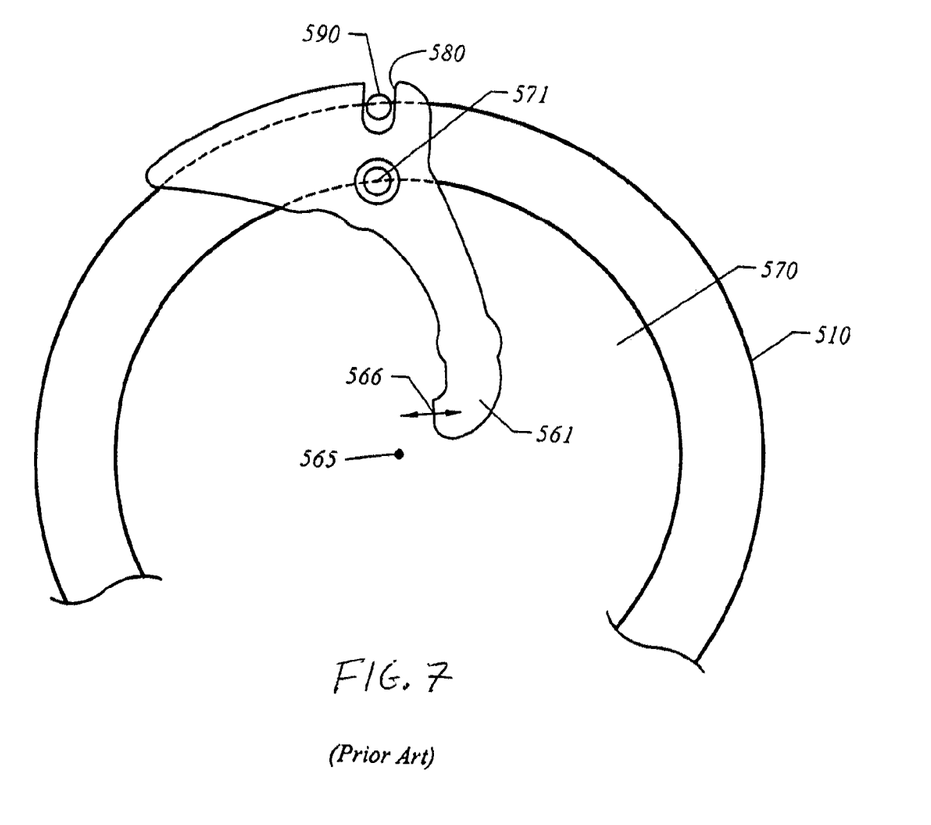
FIG. 7 is an illustration of a prior art kernel cutting knife blade showing how the knife blade is rotated inwardly and outwardly relative to longitudinal axis X-X.

FIG. 7 illustrates a prior art kernel cutting knife blade 561 and how that blade 561 is caused to rotate inwardly or outwardly from the center axis shown as 565 in FIG. 7 (axis 565 is shown as X-X in FIGS. 1-6) and in the direction of arrow 566. The knife 561 is pivotally mounted to main gear 570 at pivot point 571. Blade 561 has a C-shaped opening 580 that interacts with a pin 590 carried by the actuator gear 510.

Figure 8:
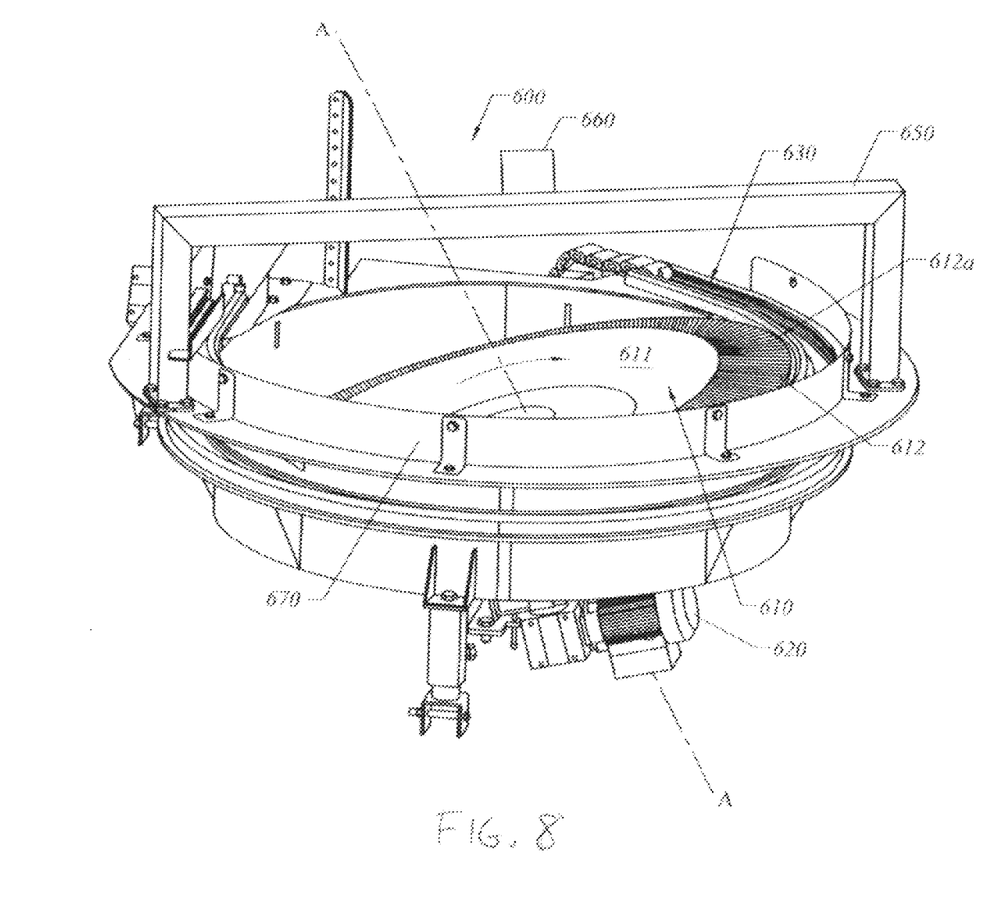
FIG. 8 is a perspective view of a novel singulator utilized in conjunction with the invention.

FIG. 8 is a perspective view of a novel singulator shown generally as 600 utilized in the present invention. A rotating, two-part disc 610 rotates around axis A-A which is offset from the vertical and driven at variable speeds by motor 620. Disc 610 includes an inner section 611 which has a relatively smooth surface. The outer peripheral section 612 of disc 610 has a roughened surface adjacent its periphery for traction. Ears (not shown) are deposited onto the center section 611 and moved to the upper peripheral segment 612*a* of the outer portion 612 due to gravity and centrifugal force. As each ear travels to the upper peripheral segment 612*a* of the disc, centrifugal force and gravity move the ear radially outwardly, transferring the ear to a chain-type conveyor 630. Only a small portion of the chain 630 is visible in FIG. 8. The chain conveyor 630 conveys the singulated ears around the perimeter of the disc 610 and into the rest of the machine. The relative speed of the chain 630 to the disc 610 can be varied to either move ears closer together during the transfer or further apart. The separation between singulated ears is required later in the machine.

A support 650 supports a sensor 660 for controlling the flow of ears onto the disc 610.

A guide rail 670 prevents ears from falling off the outside of the chain and can be adjusted toward the center of the disc 610 to accommodate varying sizes of ears and to prevent two ears from being side-by-side on the chain conveyor 630.

The foregoing description of the invention has been presented for purposes of illustration and description and is not intended to be exhaustive or to limit the invention to the precise methods disclosed. Modifications and variations are possible as further use of this invention presents new information that would promote design improvement. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. In an apparatus for automatically cutting kernels off ears of corn, wherein a circular array of movable cutting knives rotates around an axis of rotation, wherein a pair of drive rollers conveys singulated ears of corn along said axis of rotation into and through said array of kernel cutting knives, wherein said drive rollers are carried by a pair of drive shafts, and said drive shafts are movable in a plane perpendicular to said axis of rotation, the improvement comprising:

sensing means carried by at least one of said drive shafts for sensing the diameter of each ear of corn by sensing the motion of at least one of said drive shafts relative to said axis of rotation as each of said ears is driven by said pair of drive rollers into said movable knives, and knife control means for moving said array of cutting knives relative to said axis of rotation in response to input from said sensing means to efficiently cut said kernels off said ear of corn with reduced damage to said kernels.

2. The apparatus of claim 1 wherein said sensing means is a linear variable differential transformer.

3. The apparatus of claim 1 wherein said ears may be presented to said kernel cutting knives either tip end or butt end first.

4. The apparatus of claim 3 wherein the blades of said knives are mounted at a reverse angle of two to four degrees.

5. The apparatus of claim 3 wherein an assigned fixed thickness of kernels is inputted to said knife control means along with input from said sensing means to automatically adjust the position of said kernel cutting knives as each ear passes through said kernel cutting knives.

6. The apparatus of claim 1 wherein said sensing means is positioned remotely from said ears of corn.

7. In an apparatus for automatically cutting kernels off ears of corn, wherein a circular array of movable cutting knives rotates around an axis of rotation, wherein a feed mechanism conveys singulated ears of corn along said axis of rotation into and through said array of kernel cutting knives, wherein said feed mechanism contacts the surface of each ear of corn as it feeds each ear into and through said array of knives the improvement comprising:

sensing means carried by said feed mechanism, and mounted remotely from ears of corn in said feed mechanism, for sensing the diameter of each ear of corn by sensing the motion of said feed mechanism relative to said axis of rotation as each of said ears is driven by said feed mechanism into and through said movable knives, and knife control means for moving said array of cutting knives relative to said axis of rotation in response to input from said sensing means to efficiently cut said kernels off said ear of corn with reduced damage to said kernels.

8. The apparatus of claim 7 wherein said ear may be presented to said kernel cutting knives either tip end or butt end first.

9. Apparatus for automatically singulating and separating ears of corn, comprising:

a disc mounted for rotation about an axis inclined relative to a vertical axis, said disc having an upper peripheral segment and having a roughened surface adjacent its outer periphery, drive means for rotating said disc at variable speeds, feed means for depositing ears of corn onto said disc, movable track means positioned adjacent said upper peripheral segment of said disc, drive means for moving said track means at variable speeds, movable guide means positioned adjacent said track means and movable relative to said axis of rotation of said inclined disc, whereby rotation of said disc causes ears of corn to be moved onto said upper peripheral segment and onto said track means by centrifugal force, and whereby adjustment of said guide means toward said axis of rotation of said disc prevents two ears from being transferred side-by-side onto said track means.

10. The apparatus of claim 9 wherein adjustment of the relative speed of said disc and said track means causes a change in the separation of ears transferred onto said track means.

* * * * *